United States Patent
Uchida et al.

(10) Patent No.: US 8,712,097 B2
(45) Date of Patent: Apr. 29, 2014

(54) APPROACHING OBJECT DETECTION SYSTEM

(75) Inventors: Yoshitaka Uchida, Tokyo (JP); Toshiyuki Aoki, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 196 days.

(21) Appl. No.: 13/129,869

(22) PCT Filed: Nov. 19, 2009

(86) PCT No.: PCT/JP2009/069649
§ 371 (c)(1),
(2), (4) Date: May 18, 2011

(87) PCT Pub. No.: WO2010/058821
PCT Pub. Date: May 27, 2010

(65) Prior Publication Data
US 2011/0228985 A1   Sep. 22, 2011

(30) Foreign Application Priority Data

Nov. 19, 2008  (JP) ................................. 2008-296030
Nov. 9, 2009   (JP) ................................. 2009-255666

(51) Int. Cl.
*G06K 9/00* (2006.01)
*G06K 9/48* (2006.01)
*G06K 9/46* (2006.01)

(52) U.S. Cl.
USPC ........................... 382/103; 382/199; 382/203

(58) Field of Classification Search
None
See application file for complete search history.

(56) References Cited

U.S. PATENT DOCUMENTS 6,342,904 B1 *  1/2002  Vasudevan et al. ........... 715/723
(Continued)

FOREIGN PATENT DOCUMENTS

CN            1673679 A        9/2005
(Continued)

OTHER PUBLICATIONS

NPL—Tosunoglu et al., Survey on Automobile Collision Avoidance System, 1999.*

(Continued)

*Primary Examiner* — Chan Park
*Assistant Examiner* — Ha Le
(74) *Attorney, Agent, or Firm* — Knobbe Martens Olson & Bear LLP

(57) ABSTRACT

An approaching object detection system, approaching object can be accurately detected while reducing the load on a calculation processing. A first moving region detection unit (30) detects (#3) only an optical flow substantially in horizontal direction in an image (P) captured by a camera (10) (#1) and sets (#4) a rectangular image portion (Q) containing a region moving in a substantially horizontal direction according to the detected optical flow. A second moving region detection unit (40) obtains a distribution (profile) of signal values of the set rectangular image portion (Q), (#5) in a vertical direction (longitudinal direction). Furthermore, the second moving region detection unit (40) correlates distributions of signal values of image portions (Q, Q) of two continuous images (P, P) in time series (#6) based on dynamic programming based processing to obtain an enlargement rate (#7). An approaching object determining unit (50) determines according to the enlargement rate whether the object is actually approaching.

8 Claims, 16 Drawing Sheets

(56) References Cited

U.S. PATENT DOCUMENTS

| | | | |
|---|---|---|---|
| 6,445,809 B1 | 9/2002 | Sasaki et al. | |
| 6,628,805 B1* | 9/2003 | Hansen et al. | 382/107 |
| 6,753,902 B1* | 6/2004 | Kashiwazaki | 348/119 |
| 7,266,220 B2 | 9/2007 | Sato et al. | |
| 8,300,887 B2* | 10/2012 | Nishigaki et al. | 382/103 |
| 2002/0145665 A1 | 10/2002 | Ishikawa et al. | |
| 2005/0225636 A1 | 10/2005 | Maemura et al. | |
| 2006/0088188 A1* | 4/2006 | Ioffe et al. | 382/103 |
| 2008/0205706 A1* | 8/2008 | Hongo | 382/104 |

FOREIGN PATENT DOCUMENTS

| | | |
|---|---|---|
| CN | 101271527 A | 9/2008 |
| JP | 2000-74645 | 3/2000 |
| JP | 2004-56763 | 2/2004 |
| JP | 2007-233469 | 9/2007 |
| JP | 2007-257025 | 10/2007 |

OTHER PUBLICATIONS

NPL—IEEE 2006, Gandhi et al., Pedestrian Collision Avoidance Systems—A Survey of Computer Vision Based Recent Studies.*
NPL—Wilfried Enkelmann—1991, Obstacle detection by evaluation of optical flow fields from image sequences.*
Bovik et al. (Editor)—The Essential Guide to Image Processing (2009), ISBN-10: 0123744571, pp. 123-142.*
Bovik et al. (Editor)—The Essential Guide to Image Processing (2009), ISBN-10: 0123744571, pp. 123-142.*
Application of Image Recognition to Visual Assistance for Drivers, Fujitsu, 59, 4; p. 397-402 (Jul. 2008).
Application of Image Recognition to Visual Assistance for Drivers, Fujitsu, 59, 4; p. 397-402 (Jul.,2008).
International Search Report from PCT/JP2009-069649 dated Dec. 12, 2009.
Office Action dated Jan. 16, 2013 in corresponding Chinese Application No. 200980145803.3.

* cited by examiner (a)

(b)

(a)

(b)

APPROACHING OBJECT DETECTION SYSTEM

CROSS-REFERENCE TO RELATED APPLICATIONS

This application is the U.S. National Phase under 35. U.S.C. §371 of International Application PCT/JP2009/069649, filed Nov. 19, 2009, which claims priority to Japanese Patent Application No. 2008-296030, filed Nov. 19, 2008, and Japanese Patent Application No. 2009-255666, filed Nov. 9, 2009. The International Application was published under PCT Article 21(2) in a language other than English.

TECHNICAL FIELD

The present invention relates to an approaching object detection system, and particularly to a system that detects an approaching object based on two or more continuous images captured in time series by a camera.

BACKGROUND ART

In prior art the surroundings of a vehicle is captured with a camera mounted on the vehicle to display captured images on a monitor in a vehicle cabin, thereby assisting a driver and a passenger to pay attention to a blind spot from their view.

Furthermore, there is a technique in which images captured by the camera are processed to automatically detect a moving object in the images and attract a passenger's attention when the moving object is approaching the vehicle.

For detecting a moving object approaching a self-vehicle, for example, there is a known method in which continuous images in time series are subjected to optical flow processing to detect from the images a region (an image portion) whose position is changed as a moving object (Patent Documents 1 and 2).

Another technique has been proposed in which a region corresponding to moving object is identified from the images to find an enlargement rate based on a change in distance between the vertical edges of the identified region corresponding to the moving object and determine whether the moving object is approaching according to the enlargement rate (Patent Document 3).

CITATION LIST

Patent Document

Patent Document 1: Japanese Patent Application Publication No. 2007-257025
Patent Document 2: Japanese Patent Application Publication No. 2004-056763
Patent Document 3: Japanese Patent Application Publication No. 2007-233469

SUMMARY OF THE INVENTION

Problem to be Solved by the Invention

Now, to detect a moving object from an image by the above-mentioned optical flow processing, it is necessary to obtain a velocity vector (optical flow) for each of pixels constituting the image in between two or more continuous images (frames) in time series. Obtaining the velocity vector is a large load on computation processing since it need be identified by searching in all directions around a target pixel while setting all the pixels constituting the image as a target pixel in order.

Especially, for detecting the other vehicle or the like approaching the vehicle with a vehicle mounted camera, with traveling speed of the other vehicle or the like taken into account, It is difficult to deal with the detection by an arithmetic processor such as a general car-mounted microcomputer since images of the other vehicle need to be obtained in an extremely short period of time to calculate the optical flow in almost real time.

Meanwhile, the technique disclosed in Patent Document 3 can deal with the detection by a car-mounted microcomputer due to a low computation load. However, it has a problem in detection accuracy of the above-mentioned vertical edges, and may cause erroneous detection and be of little practical use.

In view of the above-mentioned solving problems, the present invention aims to provide an approaching object detection system that can accurately detect an approaching moving object while decreasing the computation load.

Means for Solving the Problem

The approaching object detection system according to the present invention is configured to perform optical flow processing on the image so as to detect only the velocity vector in a certain direction, accurately extract an image portion having the velocity vector in the certain direction with less computation load, process the extracted image portion in a different direction from the certain direction based on the dynamic programming to determine whether the imaging portion is actually approaching or not, and thereby accurately detect an approaching moving object.

Specifically, the approaching object detection system according to the present invention comprises a camera which is fixed at a predetermined position to capture an image; a first moving region detection unit configured to detect, by optical flow processing, based on a plurality of continuous images captured in time series by the camera, image portions of the images which have moved in a certain direction in time series; a second moving region detection unit configured to process, based on dynamic programming, an image portion of each of the images detected by the first moving region detection unit to determine a change in size of the image portion in a direction different from the certain direction; and an approaching object determining unit configured to determine, according to the change, whether or not a moving object corresponding to the image portion is an object approaching the camera.

Ideally, the certain direction is preferably one (direction), however, there is a possibility of a detection failure in detecting only the velocity vector in the single direction due to the angle of view of a lens for forming an image on the image pickup device of the camera. Therefore, the above-mentioned certain direction can be a direction within a narrow range of angle including the certain direction as a reference (for example, an angle range of less than 90 degrees).

In this case, the certain direction can be three directions including directions (two directions) of the angles at both ends of the narrow angle range and the reference direction (one direction), or can be four or five directions by dividing the narrow angle range. However, setting a large number of certain directions increases computation load of the optical flow processing, so that excessive division of the angle range is not preferable.

Further, the above-mentioned dynamic programming is a technique used in the so-called optimal path search in the graph theory for determining a similarity between images with enlargement and shrinkage of the images into consideration. It is also referred to as DP (Dynamic Programming) matching. That is, the enlargement and shrinkage rates between these two images before and after enlargement and shrinkage can be obtained by processing the two similar images by the dynamic programming.

Also, "the different direction from the certain direction" when the second moving region detection unit process the image portion based on the dynamic programming is preferably a direction substantially perpendicular to "the certain direction" of the velocity vector detected by the optical flow processing of the above-described first moving region detection unit.

When "the certain direction" is not a single direction (a plurality of directions in the narrow angle range) as described above, a preferable direction can be a direction substantially perpendicular to the reference direction of the plurality of directions.

In the approaching object detection system according to the present invention, the first moving region detection unit detects an image portion which has moved in a certain direction in time series in any of the images by optical flow processing based on a plurality of continuous images in time series captured by the camera; the second moving region detection unit process each detected image portion based on the dynamic programming in the different direction from the certain direction to determine a change in size of the image portion of the subsequent image over the preceding image in time series is determined, and based on the change in size, the approaching object determining unit determines whether or not the moving object corresponding to the image portion is approaching.

Furthermore, according to the approaching object detection system in the present invention, the optical flow processing by the first moving region detection unit is to detect only the velocity vector in the certain direction, so that an image portion having the velocity vector in the certain direction can be accurately detected (extracted) with less computation load. The processing based on the dynamic programming by the second moving region detection unit is light in terms of computation load, and in addition, it is to obtain the change in size by processing the image portion detected by the first moving region detection unit in the different direction from the certain direction based on the dynamic programming. Thereby, the approaching object determining unit can accurately determine whether a moving object is approaching or not.

In the approaching object detection system according to the present invention, preferably, the second moving region detection unit is configured to process, based on dynamic programming, an image portion of each of the images detected by the first moving region detection unit to obtain a distribution of signal values of each image portion in a direction different from the certain direction, and obtain the change in size based on a relation between distributions of the signal values of the respective image portions of the continuous images in time series.

Thus, according to the approaching object detection system in a preferable configuration in the present invention, the second moving region detection unit processes based on the dynamic programming each image portion of each of the plurality of images detected by the first moving region detection unit to obtain the distribution (profile) of the signal values in the different direction from the certain direction for each image portion, and to be able to easily obtain a size ratio between both image portions by correlating the distribution of the signal values of the image portion in the preceding image in time series (distribution of the signal values in the different direction from the certain direction) with the distribution of the signal values of the image portion in the subsequent image in time series (distribution of the signal values in the different direction from the certain direction). This size ratio can be set as "change in size" in the approaching object detection system according to the present invention.

In the approaching object detection system according to the present invention, preferably, the first moving region detection unit is configured to use, for the certain direction as a subject of the optical flow processing, a direction in the image corresponding to a horizontal direction and predetermined one or more directions within an angle range of 15 degrees upward to 15 degrees downward relative to the horizontal direction, and the second moving region detection unit is configured to use a direction in the image corresponding to a vertical direction as the direction different from the certain direction in the dynamic programming based processing.

According to the approaching object detection system in a preferable configuration according to the present invention, the first moving region detection unit can mainly detect an object moving in the horizontal direction because it uses, as the certain direction for a subject of the optical flow processing, the direction corresponding to the horizontal direction in the image and directions within the angle range from 15 degree upward to 15 degree downward relative to the horizontal direction.

Thus, it can detect the velocity vector not only in the single horizontal direction but also in any direction within the angle range from 15 degree upward to 15 degree downward relative to the horizontal direction, so that it can detect not only an object moving exactly in the horizontal direction but also an object moving in a direction at a slightly inclined angle relative to the horizontal direction, and can prevent a failure in detecting an object moving mainly in the horizontal direction.

Also, the second moving region detection unit processes, based on the dynamic programming, the image portion including a moving object moving mainly in the horizontal direction and detected by the first moving region detection unit and the distribution of the signal values in the image portion in the direction corresponding to the vertical direction. Accordingly, it is possible to detect enlargement, shrinkage, or neither enlargement nor shrinkage of the image portion in the vertical direction.

Thereby, the approaching object determining unit determines that an moving object in the detected image portion is a moving object (approaching object) approaching the camera when the object is moving in a substantially horizontal direction (as a result of the detection by the first moving region detection unit), and the size of the object in the vertical direction is enlarged (as a result of the detection by the second moving region detection unit).

Further, the approaching object determining unit determines that a moving object in the detected image portion is a moving object (approaching object) moving away from the camera when the object is moving in a substantially horizontal direction (as a result of the detection by the first moving region detection unit), and the size of the object in the vertical direction is shrunk (as a result of the detection by the second moving region detection unit).

Further, the approaching object determining unit determines that a moving object in the detected image portion is approaching in the diameter direction of the lens of the camera but is moving away in the optical axis direction, and therefore it is not an approaching object when the object is moving in a substantially horizontal direction (as a result of the detection by the first moving region detection unit), and the size of the object in the vertical direction is neither enlarged or shrunk (as a result of the detection by the second moving region detection unit).

Thus, it is able to avoid erroneously determining the above-mentioned moving object approaching in the diameter direction of the lens of the camera but moving away in the optical axis direction to be an approaching object and improve the accuracy of detection of an approaching object.

In the approaching object detection system according to the present invention, preferably, the approaching object determining unit is configured to determine that a moving object in the image portion is an approaching object when the size changes in a direction to enlarge.

Thus, according to the approaching object detection system in a preferable configuration in the present invention, the approaching object determining unit determines that the moving object in the image portion is an approaching object only when a result of the detection by the second moving region detection unit is that a change in the size of the image portion is an increase. Therefore, it is possible to increase the accuracy of determining an approaching object compared with determining it based solely on a result of the detection by the first moving region detection unit.

In the approaching object detection system according to the present invention, preferably, the first moving region detection unit is configured to exclude at least one of a sky region and a ground region from the image captured by the camera before detecting the moved image portion by the optical flow processing.

Thus, according to the approaching object detection system in a preferable configuration in the present invention, the computation load of the optical flow processing can be further decreased by removing in advance the sky and the ground as non-subjects of approaching object to be detected by the present invention from the image before the optical flow processing.

Note that the sky and the ground in the image normally have substantially uniform density (luminance) and hue. The first moving region detection unit is configured to determine such a region with substantially even (substantially uniform) density (luminance) distribution to be the sky region or the ground region, and remove such a region with substantially even (substantially uniform) density (luminance) distribution from the subjects of the optical flow processing before the processing. Thereby, the computation load can be decreased.

In the approaching object detection system according to the present invention, preferably, the first moving region detection unit is configured to perform optical flow processing on the two continuous images (two frames) in time series and thereby detect an image portion having moved in a certain direction in time series, and the second moving region detection unit is configured to process the two images (two frames) as a subject of the optical flow processing based on the dynamic programming and thereby determine the change in size.

Thus, according to the approaching object detection system in a preferable configuration in the present invention, an approaching object can be accurately detected based on only two continuous images in time series.

In the approaching object detection system according to the present invention, preferably, the camera is fixed at a rear of the vehicle so as to capture an image behind the vehicle.

For example, a vehicle parked by head-in rather than back-in needs to be gotten out of a parking lot or garage backward, which makes it difficult for a driver to visually check the area behind the vehicle. However, since the approaching object detection system according to the present invention where the camera is fixed to the rear of the vehicle, the system can surely detect an object approaching the vehicle even when moving backward, whereas a passenger cannot visually check it easily. Therefore, it can support safe driving of the vehicle.

In the approaching object detection system according to the present invention, preferably, the camera is attached to a vehicle, and the approaching object detection system further comprises a vehicle information acquiring unit configured to acquire vehicle information on a traveling condition of the vehicle including a vehicle speed, and an image processing unit configured to correct, when the vehicle information indicates a movement of the vehicle, a size of an image in the continuous images in time series in such a direction as to reduce a change in the size of the image according to the movement of the vehicle.

Thus, according to the approaching object detection system in a preferable configuration in the present invention, when the vehicle mounted with a camera moves, an image processing unit performs size correction to correct a change in size of an image portion on the image due to the movement of the vehicle so that it is able to prevent erroneous detection of the change in the size of the image portion due to the movement of the vehicle as an approaching object. Thus, by specifying the direction of optical flow and reducing an erroneous detection due to a movement of the vehicle mounted with the camera, it is possible to improve the accuracy of detection of a moving object even using the means with a light computation load of the dynamic programming.

In the approaching object detection system according to the present invention, preferably, the image processing unit is configured to change an enlargement rate of the image in the size correction according to a vehicle moving amount in the continuous images in time series.

Thus, according to the approaching object detection system in a preferable configuration in the present invention, the image processing unit is configured to change the enlargement rate according to the vehicle moving amount between continuous images in time series for the size correction. Therefore, compared with changing the size of a specific portion on the image, the computation load can be decreased and a change in size of a non-moving object due to a movement of a self-vehicle can be further reduced by changing the enlargement rate according to the vehicle moving amount.

In the approaching object detection system according to the present invention, preferably, the first moving region detection unit includes a variation calculating unit configured to obtain a variation in shape of a region occupied by a moving object which has moved in the certain direction between continuous images in time series and the approaching object determining unit is configured to determine the moving object as a pedestrian when the variation in shape of a region is greater than a preset value.

According to the approaching object detection system in a preferable configuration in the present invention, a pedestrian can be determined based on the variation in the shape of the region occupied by a moving object on the image. That is, a pedestrian tends to move slowly and move in an uncertain direction, so that compared with a vehicle, the optical flow in a certain direction may not notably appear in continuous images in time series or a change in size by the dynamic programming may not be obvious. However, a pedestrian swings his/her arms or steps forward with his/her legs, and the moving direction of his/her body part tends to change. Because of this, a variation occurs in the coordinates obtained by the optical flow in a certain direction, whereas a variation in objects such as a vehicle of a fixed shape is small Therefore, by determining that a moving object of the region having a certain degree of variation in the shape is a pedestrian, it is able to detect a pedestrian with a high accuracy even using the means with less computation load of the dynamic programming and the optical flow in the specified direction.

In the approaching object detection system according to the present invention, preferably, the variation calculating unit is configured to obtain a difference in area of regions occupied by a moving object which has moved in a certain direction in the continuous images in time series and set, as the variation, a value resulting from accumulation of the difference over the continuous images in time series.

Thus, according to the approaching object detection system in a preferable configuration in the present invention, it is able to determine with a high accuracy a pedestrian who moves slowly and does not changes in shape in continuous images in time series by accumulating the difference in the areas of the regions occupied by a moving object over adjacent continuous image.

Effects of the Invention

The approaching object detection system according to the present invention can accurately detect an approaching moving object with a decreased computation load.

MODES FOR CARRYING OUT THE INVENTION

Hereinafter, an approaching object detection system 100 of the first embodiment of the present invention is described with reference to the accompanying drawings.

First Embodiment

Figure 1:
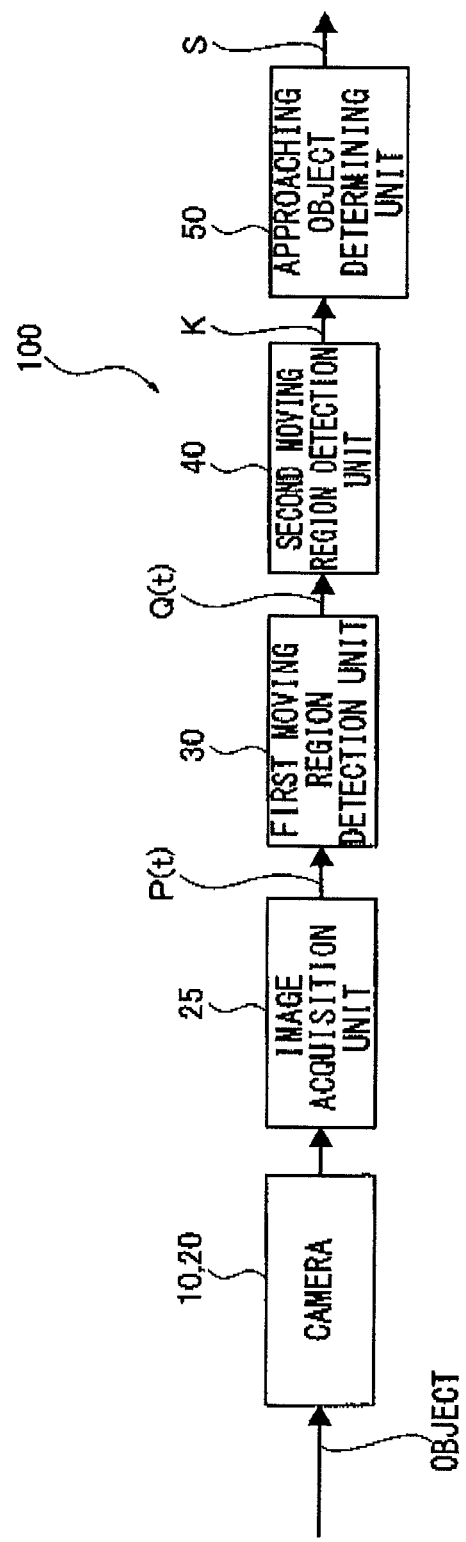
FIG. 1 is a block diagram showing the configuration of an approaching object detection system 100 according to a first embodiment of the present invention.
Figure 2:
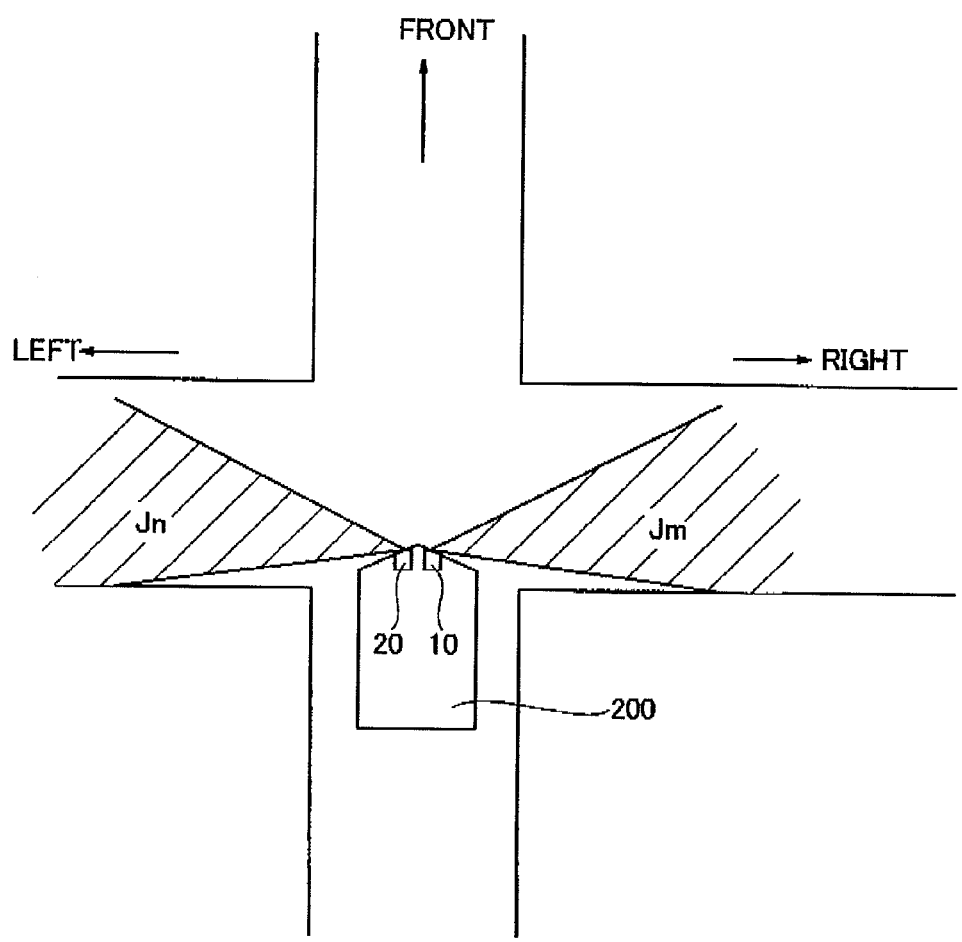
FIG. 2 is a schematic diagram showing as a typical example a situation where the approaching object detection system 100 shown in FIG. 1 is used.
Figure 3:
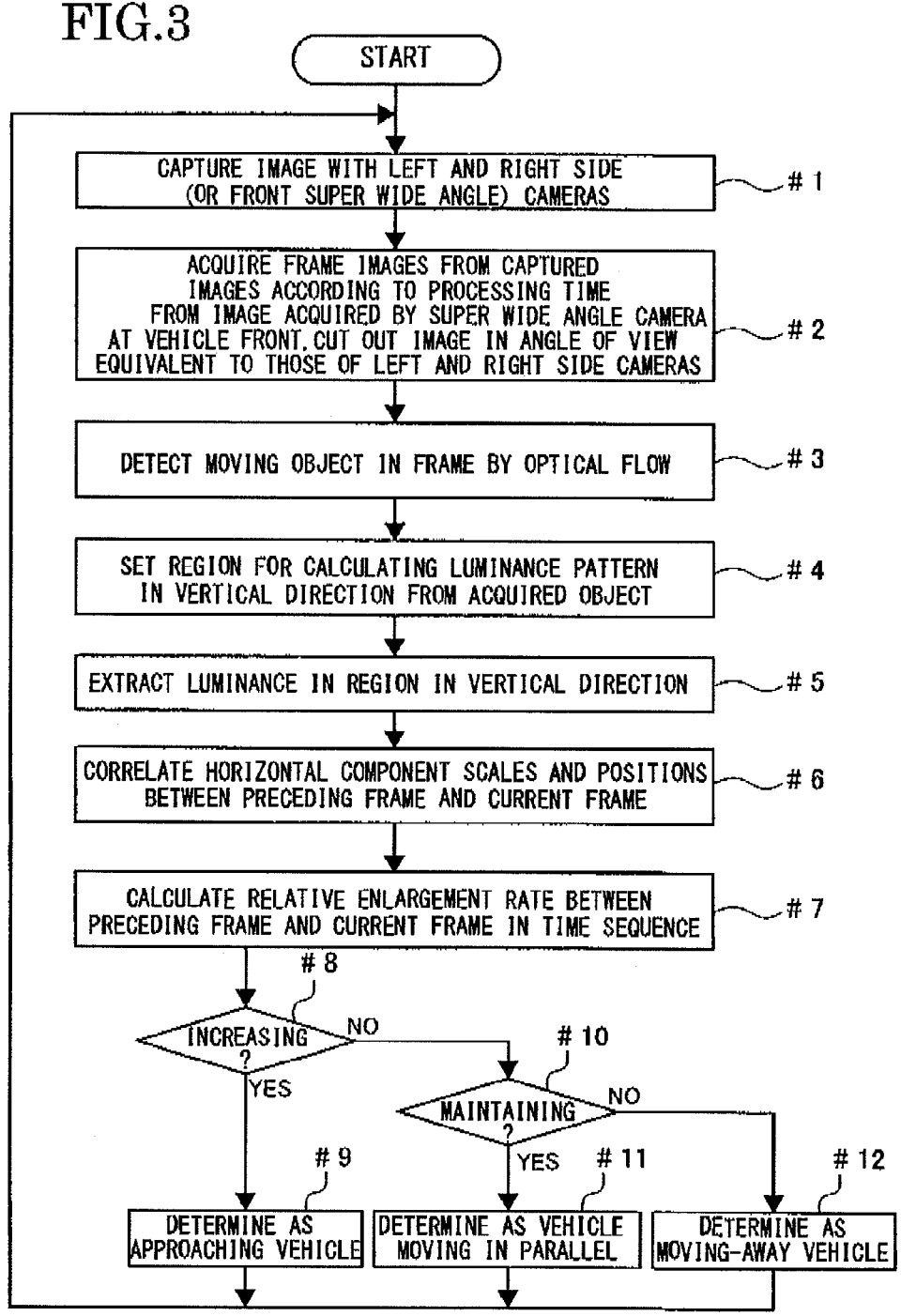
FIG. 3 is a flowchart showing processing steps of the approaching object detection system 100.

FIG. 1 is a block diagram showing the configuration of an approaching object detection system 100 according to the first embodiment (first example) of the present invention. FIG. 2 is a schematic diagram showing a typical example of a situation where the approaching object detection system 100 shown in FIG. 1 is used and shows a vehicle 200 mounted with the approaching object detection system 100 entering the intersection. FIG. 3 is a flowchart showing processing steps of the approaching object detection system 100. Hereinafter, the vehicle 200 mounted with the approaching object detection system 100 is referred to as a self-vehicle 200 for the purpose of distinction from the other vehicle 300 described later.

Figure 6:
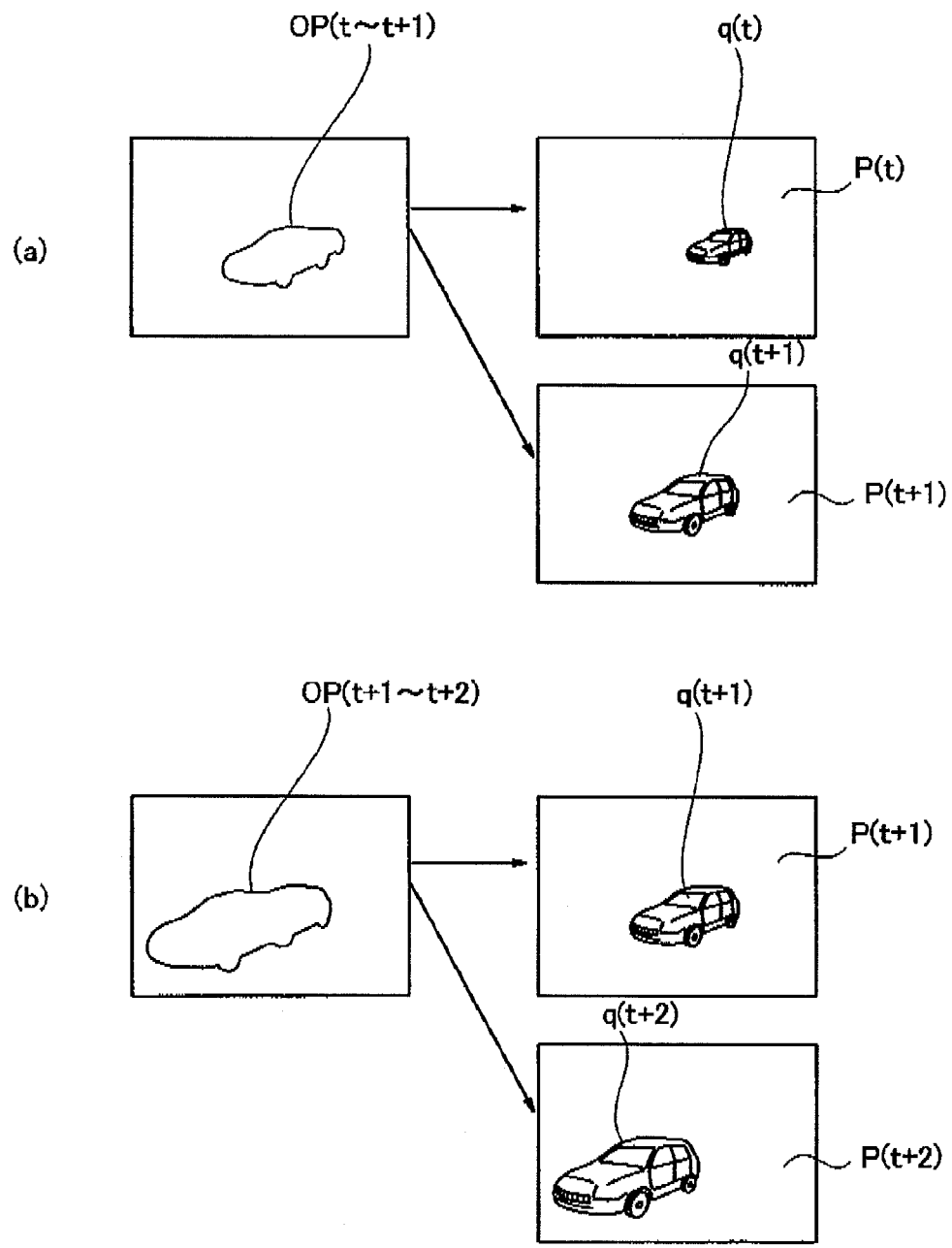
FIG. 6 shows the obtained optical flow and a region obtained by the optical flow and moving in a substantially horizontal direction.
Figure 7:
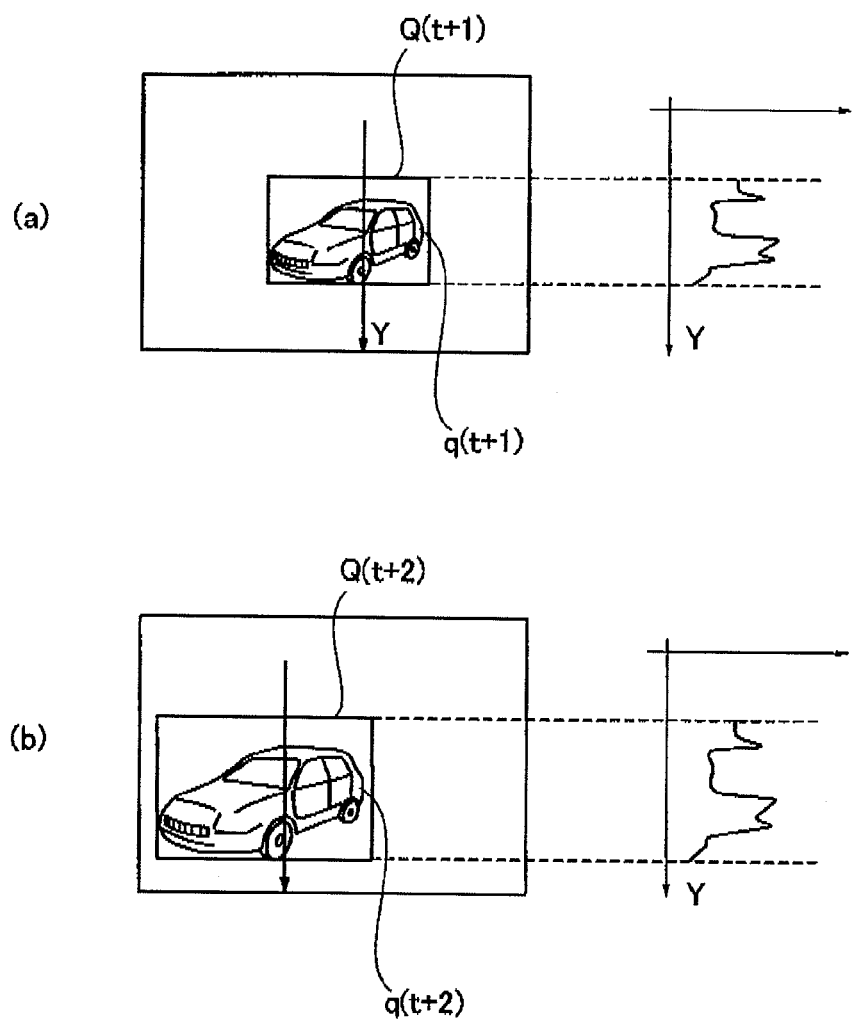
FIG. 7 shows a distribution (profile) of the signal values in the vertical direction in a rectangular image portion including the moving region.

The approaching object detection system 100 shown in the drawing comprises a camera 10 fixed at the front end of the self-vehicle 200 to capture a view Jm, as an image P(t), on one side (right side) of the self-vehicle 200 from the front end; a first moving region detection unit 30 that performs optical flow processing on two continuous images P(t), P(t+1) (see FIG. 4) captured in time series by the camera 10 to detect (extract), from images P(t), P(t+1) respectively, rectangular image portions Q(t), Q(t+1) (see FIG. 7) including regions q(t), q(t+1) (see FIG. 6) moving in a substantially horizontal direction (certain direction) in time series; a second moving region detection unit 40 that processes based on dynamic programming the image portions Q(t), Q(t+1) of the two images P(t), P(t+1) detected by the first moving region detection unit 30, respectively to obtain a change in size of the image portions Q(t), Q(t+1) in the vertical direction (direction different from the certain direction); and an approaching object determining unit 50 that determines according to the change in size whether or not the regions q(t), q(t+1) corresponding to the image portions Q(t), Q(t+1), i.e. a moving object is an object approaching the self-vehicle 200 on which the camera 10 is mounted.

The approaching object detection system 100 in the present embodiment comprises a camera 20 at the front end configured to capture a view Jn on the left side of the self-vehicle 200, in addition to the camera 10 configured to capture the view Jm on the right side of the self-vehicle 200 at the front end.

Alternatively, a single camera including an optical system with a wide field angle of 180 degrees or more can be applied instead of the above-described cameras 10, 20, for example.

In this case, the image obtained by cutting out a portion in a range of the field angle corresponding to the right side view Jm from the captured image can be used as an image captured by the right side camera 10. Likewise, the image obtained by cutting out a portion in a range of the field angle corresponding to the left side view Jn from the captured image can be used as an image captured by the left side camera 20.

Next, the operation of the approaching object detection system 100 in the present embodiment is described. First, as shown in FIG. 2, when the self-vehicle 200 mounted with the approaching object detection system 100 enters the intersection, a driver in the cabin of the self-vehicle 200 may have a difficulty in visually recognizing or may fail to recognize other vehicles, bicycles, pedestrians traveling on a road intersecting the road on which the self-vehicle 200 is entering.

Meanwhile, the front end of the self-vehicle 200 is already in the intersection, and the camera 10 mounted at the front end can therefore capture the view Jm on the right side of the crossing road. Similarly, the camera 20 mounted at the front end can capture the view Jn on the left side of the crossing road (step #1 in FIG. 3).

Hereinafter, in the approaching object detection system 100 of the present embodiment, only the view Jm on the right side captured by the camera 10 is described, and a description on the view Jn on the left side captured by the camera 20 is omitted as needed because the view Jm on the right side is symmetrical to the view Jn.

An image acquisition unit 25 acquires the image captured by the camera 10 as, for example, an image P of VGA size (width 640 [pix]×height 480 [pix]), and 30 [frame/sec] in the video signal standard NTSC in (#2 in FIG. 3).

FIGS. 4(a), 4(b), 4(c) show the images P(t), P(t+1), P(t+2) out of thus obtained images P(t), P(t+1), P(t+2), . . . in time series, and the image P(t) of (a) is the oldest image; the image P(t+1) of (b) is the second oldest image; and the image P(t+2) of (c) is the newest image.

These images P(t), P(t+1), P(t+2) show the other vehicle 300 travelling on the crossing road. Whether or not the other vehicle 300 is moving cannot be determined from only a single image, and it can only be determined based on a difference in positions of the other vehicle 300 obtained by comparing two or more continuous images P(t), P(t+1) etc. in time series.

The continuous images P(t), P(t+1), P(t+2), . . . in time series captured by the camera 10 and acquired by the image acquisition unit 25 are inputted to the first moving region detection unit 30. The first moving region detection unit 30 subjects the inputted images P(t), P(t+1), P(t+2), . . . to the optical flow processing, and detects (extracts) the rectangular image portions Q(t), Q(t+1), Q(t+2), . . . including the regions q(t), q(t+1), q(t+2), . . . that have moved in a horizontal direction (certain direction) in time series from the images P(t), P(t+1) . . . .

Specifically, the first moving region detection unit 30 obtains an optical flow in the continuous images P(t), P(t+1) in time series (hereinafter, the images P(t+1), P(t+2), similarly, in the images P(t+2), thereafter).

Here, the direction in which an optical flow is obtained is limited to a substantially horizontal direction. That is, when a moving object is extracted by the optical flow processing, in general, the direction in which an optical flow is obtained is 360 degree direction from a target pixel as shown in FIG. 5(a).

Here, an angular interval of the direction is 1 degree interval or 5 degree interval for example. With 1 degree interval, the optical flow is searched for 360 times per target pixel while with 5 degree interval, it is searched for 72 times per target pixel (FIG. 5(a) shows the directions in 10 degree interval).

Figure 5:
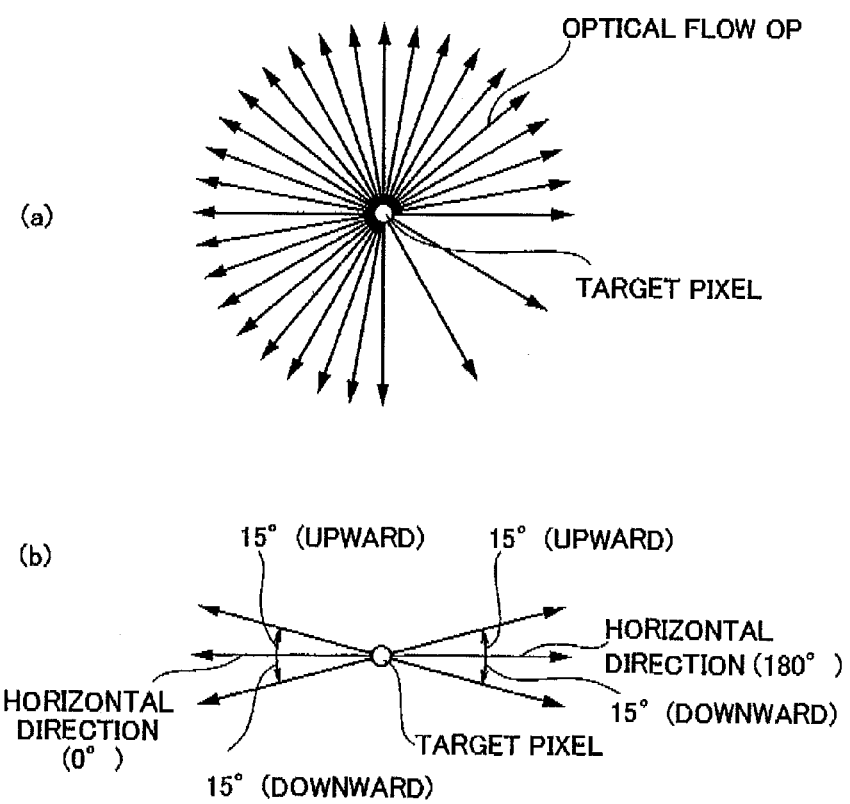
FIG. 5 is a schematic diagram showing target directions for obtaining an optical flow in which (a) shows conventional target directions (entire 360 degrees directions); and (b) shows the target directions in the present embodiment (substantially horizontal direction only).

Meanwhile, as shown in FIG. 5(b), the first moving region detection unit 30 in the present embodiment obtains the optical flow in total of only six directions as horizontal directions (0 degree and 180 degree directions) with the target pixel being a center, 15 degree upward directions relative to the horizontal direction, and 15 degree downward directions relative to the horizontal direction.

Thus, the first moving region detection unit 30 in the embodiment searches for it only 6 times per target pixel.

As a result, it is possible to dramatically reduce computation load required for the optical flow processing compared with the prior art computation load for the optical flow processing for the entire 360 degree angles.

Furthermore, with less computation load, a general vehicle-mounted microcomputer can serve as the computation microcomputer used in the first moving region detection unit 30, achieving reduction in manufacturing costs.

By the optical flow processing in substantially horizontal directions (the above-mentioned horizontal directions and 15 degree upward/downward directions), an object moving in a substantially horizontal direction in the image P can be detected (extracted) as a moving object. That is, the other vehicle 300, a bicycle, or a pedestrian is usually a moving object moving in a horizontal direction, so that the other vehicle 300, the bicycle, or the pedestrian travelling on the road can be detected as the moving object in the substantially horizontal direction without fail.

Also, although the target directions of the optical flow processing are limited to 6 directions in the present embodiment, they can be 14 directions with a little narrower 5 degree interval or other angular intervals (may not be equiangular interval).

Furthermore, in the present embodiment, the target direction of the optical flow processing is limited to a substantially horizontal direction because a moving object to be detected is an object moving substantially horizontally such as the other vehicle 300, a bicycle, and a pedestrian. However, for detecting as a target moving objects moving downward or upward (for example, a falling object, a raindrop, a load hanging from a crane), these objects move in a substantially vertical direction, so that the target direction of the optical flow processing can be limited to a substantially vertical direction.

By the above processing, optical flow OP (t to t+1) in FIG. 6(a) is obtained from the images P(t), P(t+1), and optical flow OP(t+1 to t+2) in FIG. 6(b) is obtained from the images P(t+1), P(t+2). In FIGS. 6(a) and 6(b), car-like portions in the left figures are regions which have a velocity vector (optical flow) in a substantially horizontal direction.

The first moving region detection unit 30 then specifies the regions q(t), q(t+1) occupied by the moving object moving in a substantially horizontal direction in the images P(t), P(t+1) based on the obtained optical flow OP(t to t+1) (#3 in FIG. 3).

Similarly, the first moving region detection unit 30 then specifies the regions q(t+1), q(t+2) occupied by the moving object moving in a substantially horizontal direction in the images P(t+1), P(t+2) based on the obtained optical flow OP(t+1 to t+2) (#3 in FIG. 3). In FIGS. 6(a) and 6(b), car portions in the right figures are regions q occupied by the moving object in a substantially horizontal direction.

The first moving region detection unit 30 further surrounds the region q(t) in the image P(t) in a rectangle frame, then sets it as an image portion Q(t) including a moving region, and similarly, surrounds the region q(t+1) in the image P(t+1) in a rectangle frame, then sets it as an image portion Q(t+1)

including a moving region (see FIG. 7(a)). Similarly, the first moving region detection unit 30 surrounds the region q(t+2) in the image P(t+2) in a rectangle frame, and then sets it as an image portion Q(t+2) including a moving region (see FIG. 7(b)) (#4 in FIG. 3).

Next, the image portions Q(t), Q(t+1), Q(t+2), . . . detected by the first moving region detection unit 30 are inputted to the second moving region detection unit 40. The specified image portions Q by the first moving region detection unit 30 are promptly inputted from the first moving region detection unit 30 to the second moving region detection unit 40 sequentially.

The second moving region detection unit 40 performs DP matching processing on the image portions Q sequentially inputted, between two continuous image portions in time series Q(t) and Q(t+1), between the image portions Q(t+1) and Q(t+2), . . . (#5, #6, #7 in FIG. 3).

Figure 8:
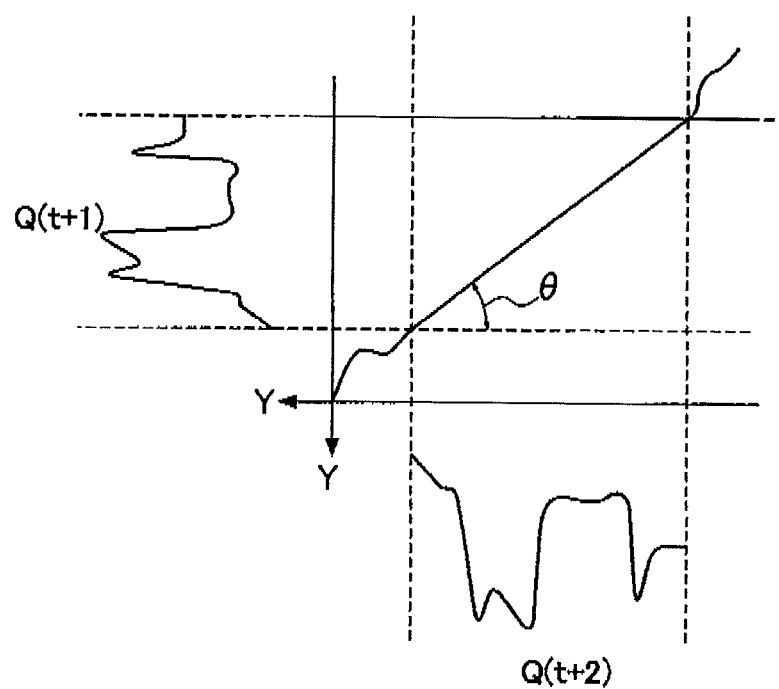
FIG. 8 is a graph showing a relation between a distribution of signal values of an image portion relative to preceding image in time series and a distribution of signal values of an image portion relative to a subsequent image in time series, using the signal values.

Specifically, as shown in each of FIGS. 7(a) and 7(b), for each inputted image portion Q, a distribution (profile) of image signal values (pixel values such as luminance values) in the vertical direction at a predetermined horizontal position is obtained (#5 in FIG. 3). Then, for image portions in the pair of continuous images in time series, the distribution of the signal values of the image portion Q(t+1) in relatively preceding image P(t+1) in time series obtained in #5 is correlated with the distribution of the signal values of the image portion Q(t+2) in relatively subsequent image P(t+2) in time series determined in #5, as shown in FIG. 8 (#6 in FIG. 3). By matching the correlated distributions, the enlargement rate K (or ratio (K=1/(tan≡))) of the size of the image portion Q(t+2) to the size of the image portion Q(t+1) is calculated (#7 in FIG. 3).

Similarly, the respective image portions of other pairs of continuous images in time series are sequentially processed by the DP matching, and obtained enlargement rates K are sequentially inputted to the approaching object determining unit 50.

Based on the enlargement rate K detected by the second moving region detection unit, the approaching object determining unit 50 determines that the region q (image of moving object (the other vehicle 300 in the figure)) included in the image portion Q is approaching or moving away from the self-vehicle 200, or approaching in a substantially horizontal direction but moving away in the optical axis direction of the camera 10 (for example, a vehicle moving in parallel to the self-vehicle) so it is not approaching the self-vehicle 200 (#8, #9, #10, #11, #12 in FIG. 3).

Figure 9:
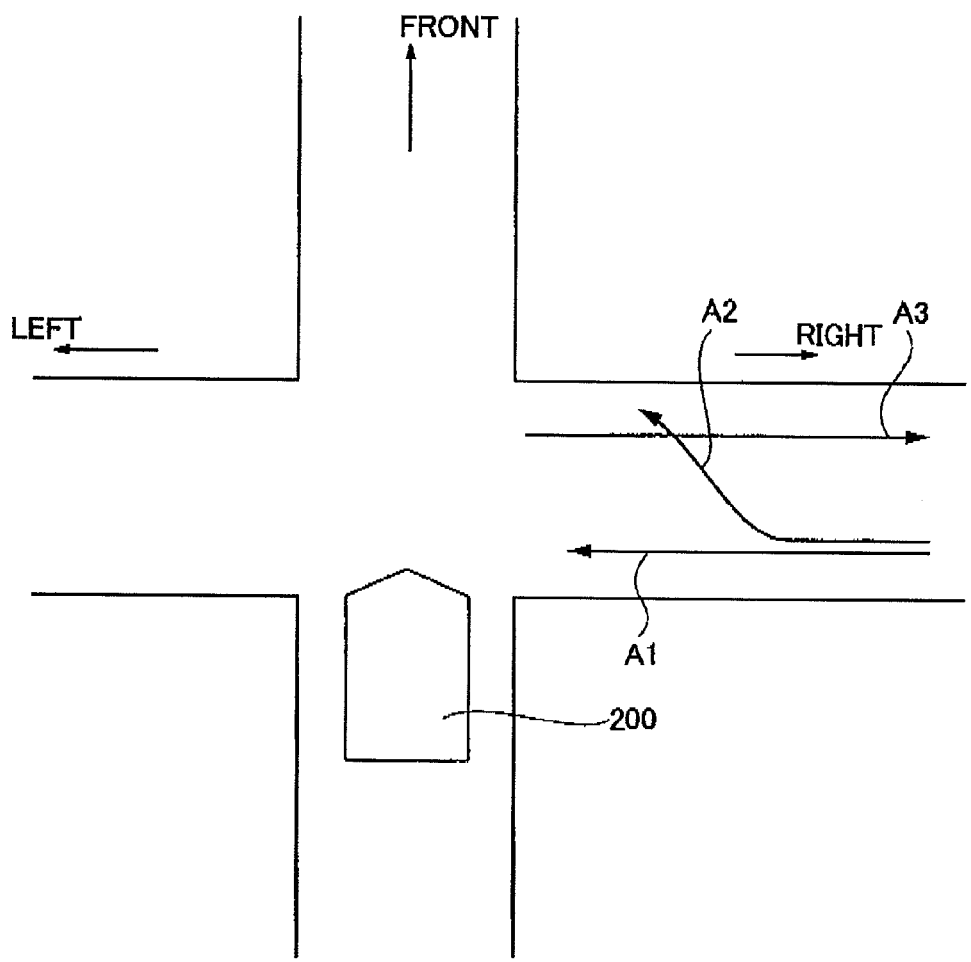
FIG. 9 is a schematic diagram showing moving states of an object when it is determined to be approaching the vehicle, moving away from the vehicle, or approaching nor moving away therefrom.

Specifically, when the enlargement rate K exceeds 1.0, between the two continuous images in time series P(t), P(t+1), the image portion Q(t+1) in the relatively subsequent image P(t+1) in time series is greater in size than the image portion Q(t) in the relatively preceding image P(t) in time series. Therefore, it can be determined that the size is increasing (#8 in FIG. 3), and the moving object corresponding to the region q included in the image portion Q is determined as an object approaching the self-vehicle 200 (for example, an approaching vehicle) as indicated by A1 in FIG. 9 (#9 in FIG. 3).

Meanwhile, when the enlargement rate K does not exceed 1.0, between the two continuous images in time series P(t), P(t+1), the image portion Q(t+1) in the relatively subsequent image P(t+1) in time series is not greater in size than the image portion Q(t) in the relatively preceding image P(t) in time series. Thus, it can be determined that the size is not increasing (#8 in FIG. 3). Then, it is determined whether the size remains the same (#10 in FIG. 3).

That is, when the enlargement rate K is about 1.0, between the two continuous images in time series P(t), P(t+1), the image portion Q(t+1) in the relatively subsequent image P(t+1) in time series and the image portion Q(t) in the relatively preceding image P(t) in time series are almost the same in size. Thus, it can be determined that the size remains the same (#10 in FIG. 3). Thus, the moving object corresponding to the region q included in the image portion Q is determined as an object approaching the self-vehicle 200 in the substantially horizontal direction but is moving away in the optical axis direction of the camera 10 as indicted by A2 in FIG. 9 (for example, a vehicle moving in parallel to the self-vehicle) (#11 in FIG. 3).

Furthermore, when the enlargement rate K is below 1.0, between the two continuous images in time series P(t), P(t+1), the image portion Q(t+1) in the relatively subsequent image P(t+1) in time series is smaller in size than the image portion Q(t) in the relatively preceding image P(t) in time series. Thus, it can be determined that the size does not remain the same (#10 in FIG. 3). The moving object corresponding to the region q included in the image portion Q is determined to be an object moving away from the self-vehicle 200 as indicated by A3 in FIG. 9 (#12 in FIG. 3).

As described above, the approaching object detection system 100 according to the present embodiment is configured that by the optical flow processing on two continuous images P, P in time series, the first moving region detection unit 30 detects (extracts) image portions Q, Q of the images P, P that have moved in a substantially horizontal direction in time series; the second moving region detection unit 40 processes the image portions Q, Q in the vertical direction based on dynamic programming to obtain a variation in size of the image portion Q(t+1) in the image P(t+1) relatively subsequent in time series with respect to the size of the image portion Q(t+2) in the image P(t+2) relatively preceding in time series; and based on the variation in size, the approaching object determining unit 50 determines whether a moving object corresponding to the image portions Q(t), Q(t+1) is approaching or not.

According to the approaching object detection system 100, the first moving region detection unit 30 detects only the velocity vector in the substantially horizontal direction by the optical flow processing, which makes it possible to accurately detect (extract) an image portion Q corresponding to the other vehicle 300 or the like moving in the substantially horizontal direction with less computation load. The dynamic programming based processing by the second moving region detection unit 40 is also light in terms of computation load. In addition, the approaching object determining unit 50 can accurately determine whether the image portion is approaching or not by processing, based on dynamic programming, the image portion Q detected by the first moving region detection unit 30 in the vertical direction to obtain the change in size.

Therefore, it is possible to prevent failure in detecting an object moving in a substantially horizontal direction as well as to reduce an erroneous detection since only the moving object actually approaching is detected as an approaching object. Accordingly, it is possible to accurately detect an approaching moving object with less computation load.

Also, according to the approaching object detection system 100 of the present embodiment, the second moving region detection unit 40 processes based on dynamic programming the respective image portions Q, Q in the two images P, P, detected by the first moving region detection unit 30 to obtain the distribution (profile) of the signal values in the vertical direction for each of the image portions Q, Q, and correlates the distributions of the signal values of the image portion Q(t), Q(t+1) in the preceding and subsequent images P(t), P(t+1) in time series with each other, using these signal values. Thereby, it is able to easily calculate the ratio of the size of the image portions Q(t), Q(t+1) and easily determine whether the moving object is actually approaching or not.

In the approaching object detection system 100 according to the present embodiment, upon detection of an object approaching the self-vehicle 200 (for example, an approaching vehicle) (#9 in FIG. 3), the approaching object determining unit 50 outputs a signal S to attract the attention of a passenger such as a driver in the cabin of the vehicle or give an alarm to the passenger.

Upon receipt of the signal S, an image display device or an alert device in a known vehicle-mounted system (for example, a car navigation system, a voice guidance system, a camera monitor system, and a vehicle back-up warning alarm system) can display a message or issue an alert with audio so as to attract the attention of the passenger or give the passenger an alarm.

Figure 10:
FIG. 10 shows an example of a frame displayed on an image display device to attract attention.

As an example of display of a message on the image display device, the region q representing an approaching object can be surrounded with a blinking rectangular frame T or the frame T in a vivid, visually stimulating color as shown in FIG. 10.

The above embodiment has described only on the right side view Jm captured by the camera 10 in the approaching object detection system 100. For the left side view Jn captured by the camera 20, the operation can be symmetrically applied.

In the approaching object detection system 100 of the present embodiment, the first moving region detection unit 30 can remove at least one of the regions corresponding to the sky and the ground from the image P captured by the camera 10 before detecting the moving region q (the image portion) by the optical flow processing.

The sky region and the ground region are not approaching objects to be detected by the approaching object detection system 100. Accordingly, with the sky region and the ground region from the image P removed before the optical flow processing, the computation load for the optical flow processing can be further decreased.

Figure 4:
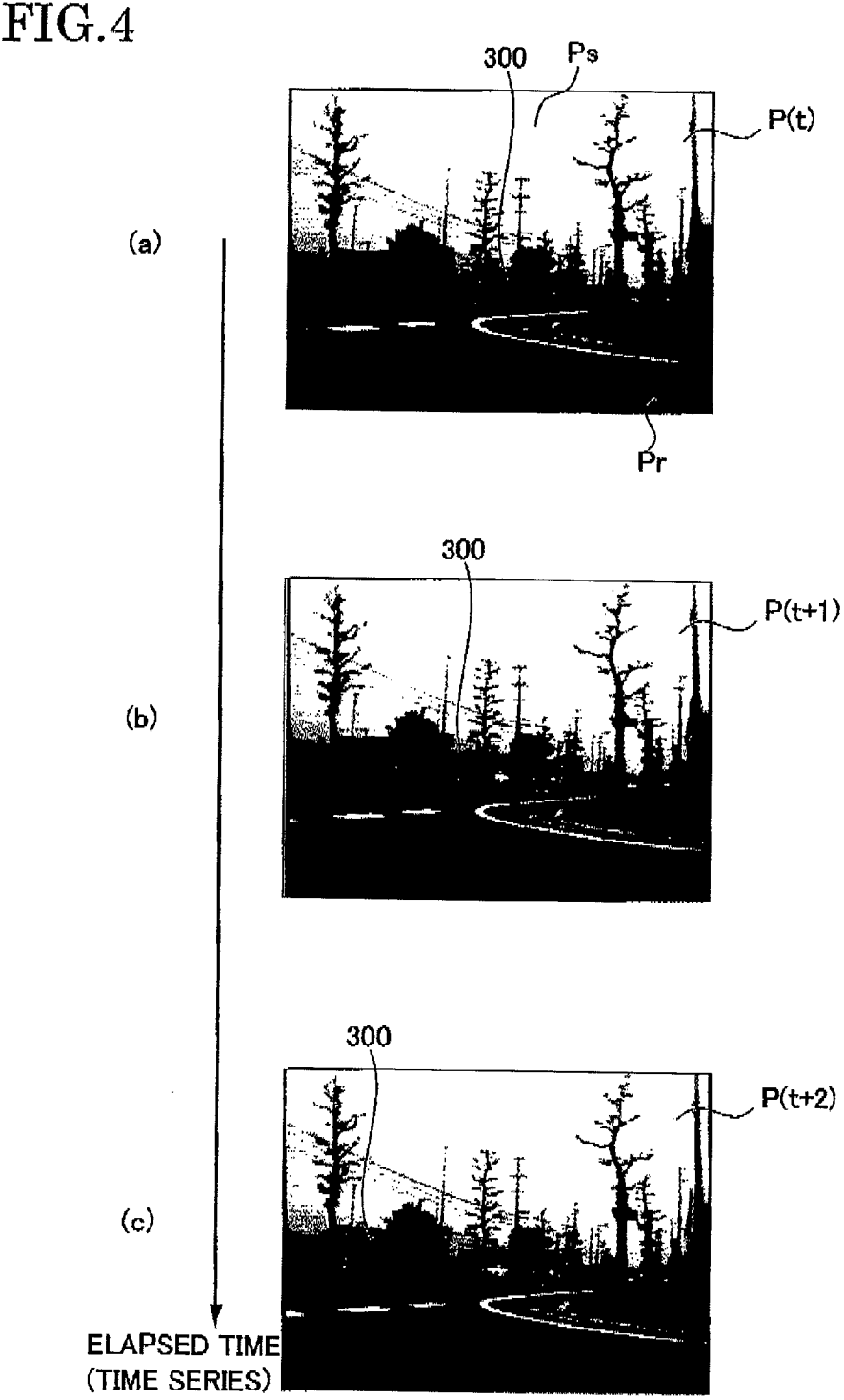
FIG. 4 shows an example of images captured in time series by a camera in which (a) is the oldest image; (b) is the second oldest image; and (c) is the newest image.

Because the sky and the ground in an image normally have almost uniform density (luminance) and hue, the first moving region detection unit is configured to determine such a region with substantially even (substantially uniform) density (luminance) distribution to be the sky region (denoted by letter symbol Ps in FIG. 4(*a*)) or the ground region (denoted by letter symbol Pr in FIG. 4(*a*)), and remove these regions with substantially even density (luminance) distribution from the subjects of the optical flow processing before the processing The computation load can be decreased accordingly.

In the approaching object detection system 100 according to the present embodiment, the first moving region detection unit 30 is configured to detect the region q in the image P which has moved to a certain direction in time series by the optical flow processing on two continuous images in time series (two frames); and the second moving region detection unit 40 is configured to obtain a change in size of the images by the dynamic-based-programming processing on the two images (two frames) subjected to the optical flow processing. Thereby, it is able to accurately detect an approaching moving object based only on two continuous images in time series.

Second Embodiment

Next, an approaching object detection system 100*b* according to the second embodiment is described. The approaching object detection system 100*b* according to second embodiment is a modification of the first embodiment so that the same reference symbols will be given to the same or like components to those of the first embodiment and a description thereof will be omitted. A difference from the first embodiment will be mainly described.

Figure 11:
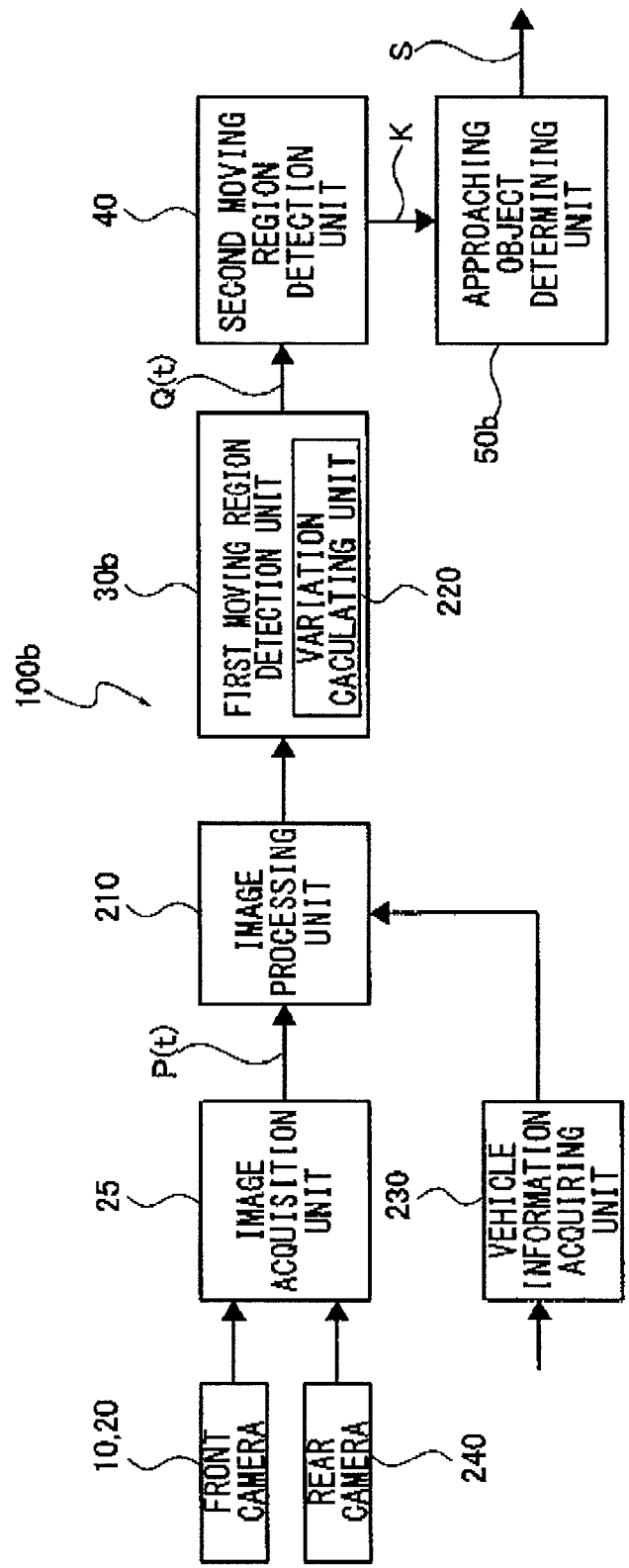
FIG. 11 is a block diagram showing an approaching object detection system 100b according to a second embodiment of the present invention.

In FIG. 11 the approaching object detection system 100*b* according to the second embodiment comprises a camera 240, an image processing unit 210, and a variation calculation unit 220 in addition to the components described in the first embodiment.

The camera 240 is fixed at the rear of the self-vehicle 200 to capture an area behind the self-vehicle 200. The image processing unit 210 corrects the image P obtained in the image acquisition unit 25 based on vehicle information from a vehicle information acquiring unit 230, then outputs the corrected image P to the first moving region detection unit 30*b*.

The vehicle information acquiring unit 230 acquires vehicle information from a not-shown control unit which controls the traveling of the vehicle through CAN communication or the like. The vehicle information includes shift information indicating the shift position of the vehicle, vehicle speed information for acquiring the moving amount of the vehicle, and rudder angle information for acquiring the rotational component of the vehicle. The vehicle speed information can be obtained not only from the signal of a not-shown vehicle speed sensor but also from the signal of a not-shown wheel speed sensor during a low speed driving in which the detection accuracy of the vehicle speed sensor is low.

Figure 12:
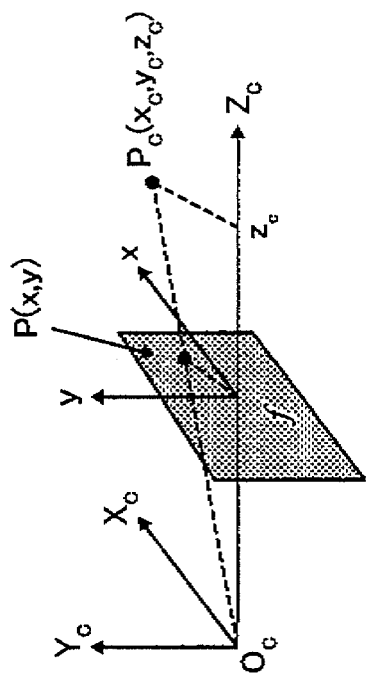
FIG. 12 is an explanatory diagram showing a relationship between an actual image captured by cameras 10, 20 and an image P projected on a two-dimensional plane.

The image processing unit 210 corrects the size and lens distortion of the image P. First, the size correction is described. FIG. 12 is a diagram showing a relationship between actual images captured by the cameras 10, 20 and the image P projected on a two-dimensional plane. As shown in the drawing, the actual images (three-dimensional camera coordinate Pc) captured by the cameras 10, 20 at a position 0*c* are converted to the image P on a screen projected onto the two-dimensional plane.

When the self-vehicle 200 moves forward or backward in this state, an object in the image P on which the camera coordinate Pc is projected is enlarged or shrunk according to the moving direction of the self-vehicle 200.

Figure 13:
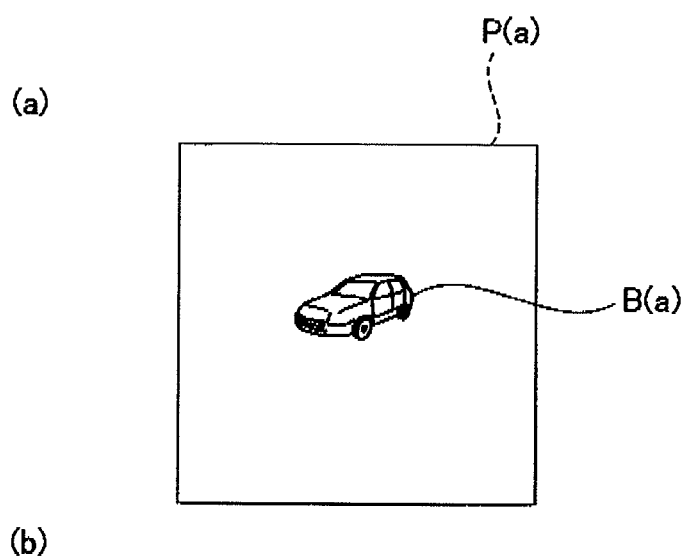
FIG. 13 is a diagram showing an example of enlarging an image of an object projected on the image P when a self-vehicle 200 moves forward; (a) shows the self-vehicle 200 before moving forward; and (b) shows the self-vehicle 200 after moving forward.
Figure 13:
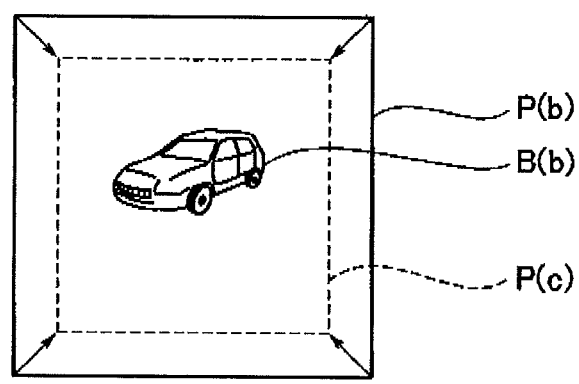

For example, when the self-vehicle 200 moves forward and approaches the camera coordinate Pc, the object image in the image P is enlarged. An example is shown in FIG. 13. In a case where an object image B(a) in an image P(a) shown in FIG. 13(*a*) is obtained before the self-vehicle 200 moves forward (the vehicle as the object image B(a) is assumed to stop), an object image B(b) in an image P(b) is enlarged as shown in FIG. 13(*b*) after the self-vehicle 200 approaches the camera coordinate Pc.

Then, the image processing unit 210 calculates the moving amount of the self-vehicle 200 between the image P(a) in FIG. 13(*a*) and the image P(b) in FIG. 13(*b*) based on the vehicle speed information obtained by the vehicle information acquiring unit 230, for example, and uses calculated moving amount as a distance correction value for perspective projection (coordinate conversion) to correct the images P(a), P(b) so that the projection size of the object image B(b) in the current image P(b) becomes equal to that of the object image B(a) in the image P(a) of the preceding frame, and obtains an image P(c) with a lower enlargement rate than that of the image P. Thereby, it makes it possible to make uniform the size of a non-moving object such as a background in each image P even with movement (forward, backward) of the self-vehicle 200 as well as to enlarge or shrink only the moving object approaching or moving away.

Figure 14:
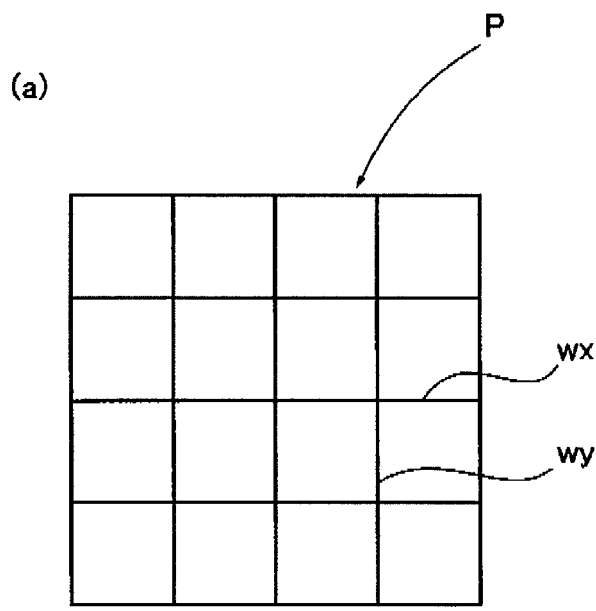
FIG. 14 is a diagram showing lens distortion correction in an approaching object detection system 100b of the second embodiment; (a) shows an image after the lens distortion is corrected; and (b) shows the image before the lens distortion is corrected.
Figure 14:
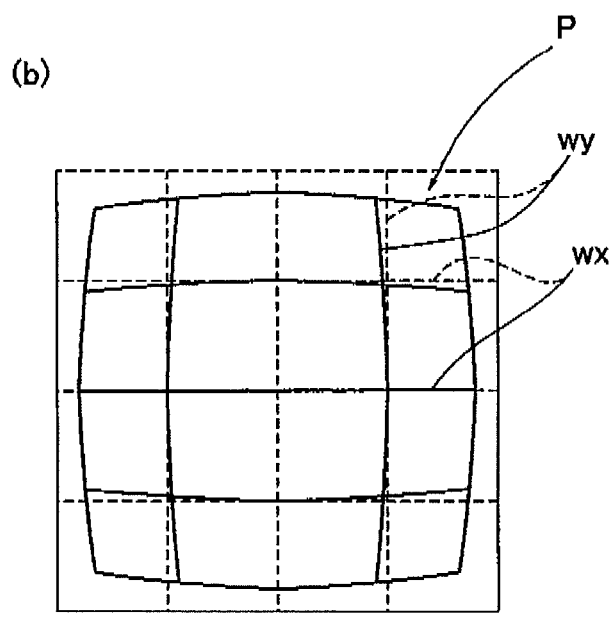

Next, lens distortion correction is described. The lens distortion correction eliminates or reduces a distortion caused by the lens characteristics of the cameras 10, 20, 240. Specifically, depending on a lens, images captured through the lens periphery and the focal point of the lens may be different. For example, FIG. 14(b) shows an example of distortion due to barrel distortion aberration where frames wx and wy show a curved distortion. Then, with a lens having such distortion, an image is subjected to image processing (lens distortion correction) to form undistorted frames wx, wy in a linear shape as indicated by dotted lines in FIG. 14(a). By the lens distortion correction, it is able to maintain a constant relation between the size of an object on the image P and the distance from the self-vehicle 200 at any position on the image P.

The first moving region detection unit 30b performs the optical flow processing on the continuous images P in time series after the image processing unit 210 corrects them, to detect the image portions Q which have moved in a certain direction in time series. The optical flow processing is the same as in first embodiment, therefore, a description thereof is omitted.

Furthermore, the variation calculating unit 220 of the first moving region detection unit 301, obtains a variation in the shape of the region q occupied by the moving object (see FIG. 11). The variation in the shape is used for determining a pedestrian by the approaching object determining unit 50b described later.

In the second embodiment, a difference in areas of the regions q occupied by the moving object between the continuous images P in time series is determined to add the difference in pre-defined frames and use it as a value representing a variation in the shape of the region q. That is to say, when an approaching object is a vehicle, its shape is unchanged and a change in the area it shows between continuous frames is small. On the other hand, when an approaching object is a pedestrian, the size of the region q having a horizontal optical flow is varied because the moving directions of his/her hands and legs change while a change between the continuous frames is small because his/her moving speed and the speed of the hands and legs are low. Therefore, by accumulating the area difference over the plurality of frames, the larger the continuous change in shape (area) of the region q between frames, the greater accumulated value the region shows. This value can be used to indicate the degree of the variation in the shape of the region q.

The approaching object determining unit 50b determines a pedestrian in addition to a vehicle approaching, a vehicle moving in parallel, and a vehicle moving away as described in the first embodiment. In this case, the approaching object determining unit 50b extracts, as a an image portion Q as a target object, an object in a size which is likely to be considered as a pedestrian or the other vehicle 300. The image portion Q is determined as a pedestrian when the image portion Q extracted as the target object has a greater variation in the shape than a predetermined value (degree). In this case, it is determined by determining whether or not the accumulated value of the area difference of the regions q in the above-described continuous images P is greater than a predetermined threshold value.

Further, when the target object does not show a greater variation in the shape than a predetermined value (degree), using the enlargement rate K determined by the second moving region detection unit 40, the target object is determined as the other vehicle 300 approaching with the enlargement rate K being greater than 1 and the target object enlarging in size. When the enlargement rate K is substantially 1 and the target object is maintaining the size, the target object is determined as a vehicle moving in parallel with the self-vehicle 200. When the enlargement rate K is less than 1, the target object is determined as a vehicle (moving object) moving away.

Figure 15:
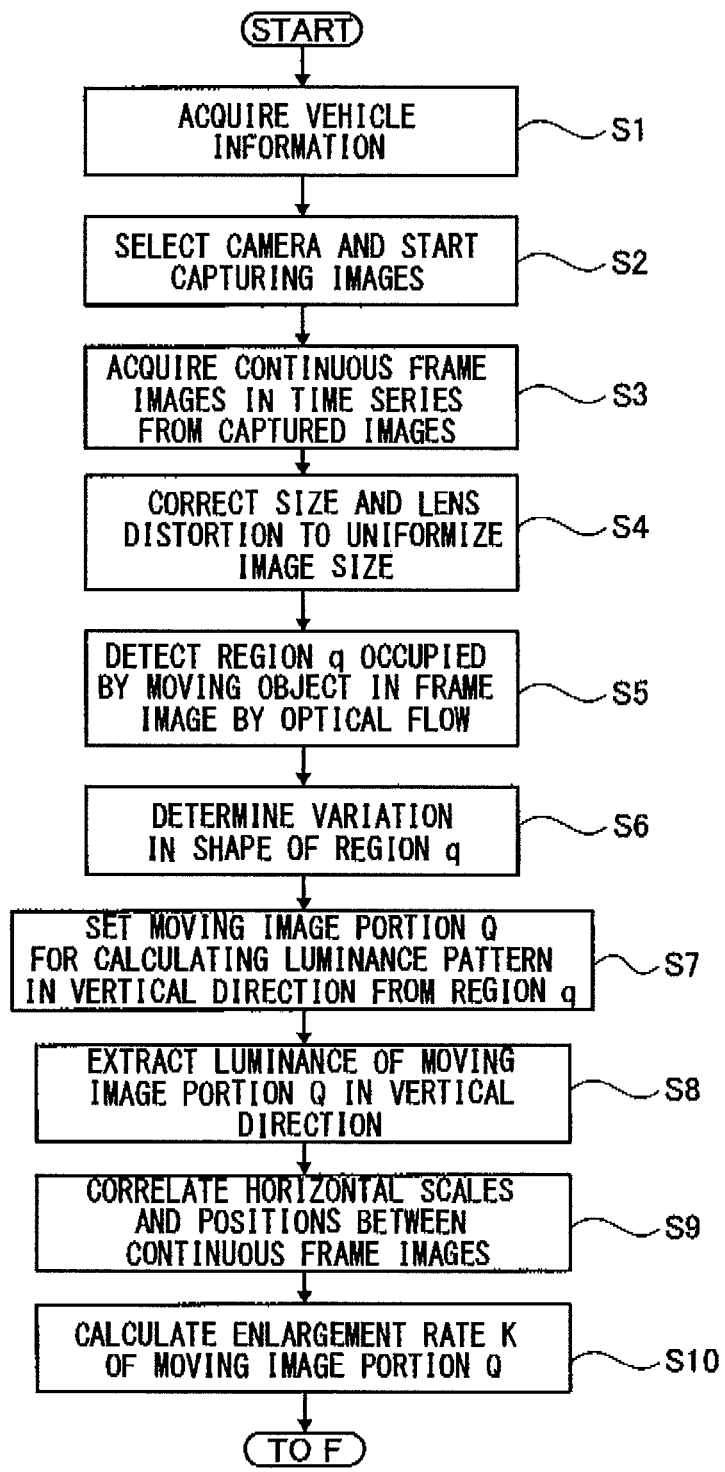
FIG. 15 is a flowchart showing the first half of the processing steps of the approaching object detection system 100b in the second embodiment.
Figure 16:
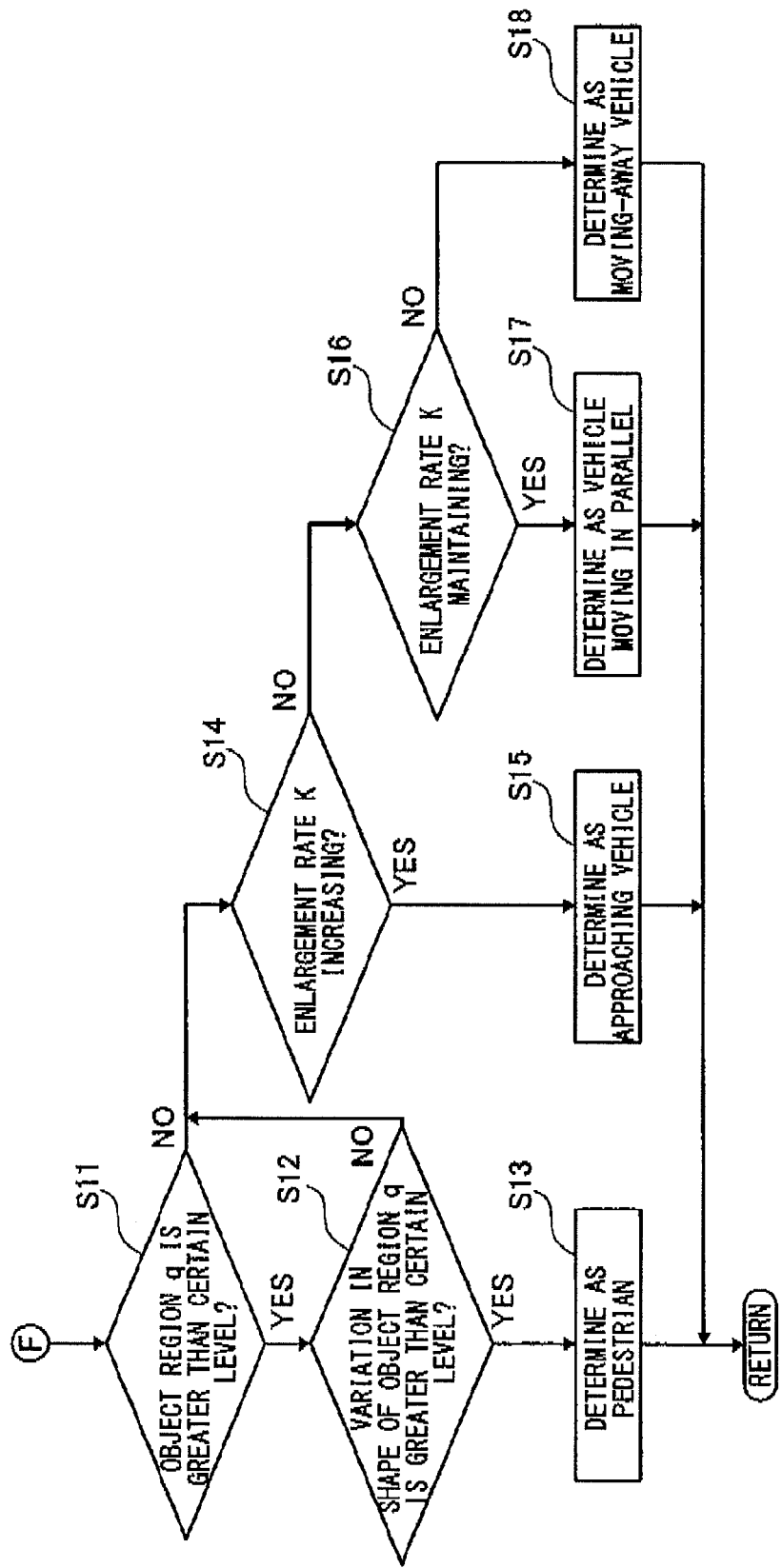
FIG. 16 is a flowchart showing the second half of the processing steps of the approaching object detection system 100b in the second embodiment.

Next, the flow of the processing of the approaching object detection system 100b (referred to as an approaching object detection processing) in the second embodiment is described based on the flowcharts of FIGS. 15 and 16. The approaching object detection processing is to be performed when a vehicle moves forward and enters an intersection or a vehicle moves backward as shown in FIG. 2 described above. The approaching object detection processing can be configured to automatically start upon detecting that such a vehicle is entering intersection or moving backward or to be manually started by a driver's turning on a switch to activate the approaching object detection processing.

Also, for the sake of simplifying control, a vehicle forwarding and entering an intersection can be detected when the vehicle speed falls below a predetermined speed due to a driver's braking operation or can be determined based on information of a not-shown navigation system or other driving support systems.

First, in step S1 the vehicle information acquiring unit 230 acquires vehicle information and then the process proceeds to the next step S2.

In step S2, any one of the cameras 10, 20 at the front of the vehicle and the camera 240 at the rear of the vehicle is selected to start capturing an image (=#1), and the process proceeds to step S3. Specifically, when the self-vehicle 200 is determined to be moving forward, the cameras 10, 20 at the front of the vehicle capture an image based on the vehicle information obtained by the vehicle information acquiring unit 230 while when the self-vehicle 200 is determined to be moving backward, the camera 240 at the rear of the vehicle captures an image. In the following description, it is assumed that the cameras 10, 20 at the front of the vehicle capture an image in the situation shown in FIG. 2.

In step S3, the image acquisition unit 25 acquires the image P from the images captured by the cameras 10, 20 according to processing time (=#2), then the process proceeds to the next step S4. In the present embodiment 30 frames of the image P are acquired per second as described above.

In step S4, the image processing unit 210 performs the above-described size correction and lens distortion correction and the process proceeds to step S5.

In step S5, the first moving region detection unit 30b detects the region q occupied by the moving object in the image P by the optical flow processing (=#3), and the process proceeds to step S6.

Next, in step S6 the variation calculating unit 220 of the first moving region detection unit 30b obtains the variation (accumulation of the area difference between continuous images) in the shape of the region q occupied by the moving object obtained in step S5.

In step S7 the first moving region detection unit 30b sets the image portion Q used for calculation of luminance pattern by the dynamic programming of the second moving region detection unit 40 (=#4) and the process proceeds to step S8.

In steps S8 to S10 the second moving region detection unit 40 calculates the enlargement rate K (or ratio $K=1/(\tan \theta)$) between continuous image portions Q in time series by the dynamic programming (as in #5 to #7 in the first embodiment).

In steps S11 to S18 the approaching object determining unit 50b determines presence/absence of a pedestrian, a vehicle approaching, a vehicle moving in parallel, and a vehicle moving away.

First, in step S11 a determination is made on whether or not the image portion Q is greater than a certain level, and with the image portion Q being greater, the process proceeds to step S12, otherwise the process proceeds to step S14. Here, "greater than a certain level" signifies that the size of the image portion Q on the image P is so large that it is necessary to avoid colliding with the self-vehicle 200. That is to say, the size of the image portion Q on the image P corresponds with the actual size of the moving object and the distance between the moving object and the self-vehicle 200. For example, in a case where the moving object is the other vehicle 300, the other vehicle 300 has a certain amount of size and moves at a high speed so that to avoid collision, it needs to be paid attention to well in advance from when it is far away with a certain distance (the size on the image P is small). Meanwhile, with the moving object being a pedestrian, it is smaller in size than the other vehicle 300 moves at a low speed so that it needs to be paid attention to from when the other vehicle 300 is closer to the self-vehicle 200 with a certain distance (the size on the image P is large) to avoid collision. With these taken into consideration, the threshold values for the size on the image P needed to be identified as an approaching object are defined in advance based on actual measurements irrespective of the moving object being the other vehicle 300 or a pedestrian. In step S11 the determination is made by comparing the threshold value with the size of the region q.

In step S12 a determination is made on whether or not the variation in the shape of the region q (accumulated value of the area difference in set frames between the regions q in the continuous images P in the second embodiment) occupied by the moving object obtained in step S6 is greater than a certain level. With the variation being greater, the process proceeds to step S13, otherwise the process proceeds to step S14. Here, "greater than a certain level" signifies that the moving object is likely considered to be a pedestrian or a bicycle from a degree of the variation in the shape. The determination is made by comparing the size of the region q with a preset threshold value based on actual measurements of pedestrians and bicycles.

In step S13 where the variation in the shape is greater than a certain level, the image portion Q is determined as a pedestrian including a bicycle, and the process returns to step S1. A pedestrian as the moving object on the image of the region q shows a large variation in the shape as described above but a change of the center-of-gravity of the region q is small, therefore, such a change can be used as AND condition for determining a pedestrian.

Step S14 and subsequent steps S15 to S18 where the variation in the shape is not greater than a certain level are similar to #8 to #12 in the first embodiment. When the enlargement rate K is increasing, the process proceeds to step 15, and the image portion Q is determined as an approaching vehicle; when the enlargement rate K is maintaining the value, the process proceeds to step 17, and the image portion Q is determined as a vehicle moving in parallel; and when the enlargement rate K is neither increasing or maintaining the value, the process proceeds to step 18, and the image portion Q is determined as a vehicle moving away (non-approaching object).

Next, the operation of the approaching object detection system 100b in the second embodiment is described, using the situation where the self-vehicle 200 mounted with the approaching object detection system 100b enters the intersection in FIG. 2, as in the first embodiment.

At such an intersection, the approaching object detection system 100b in the embodiment starts the object detection processing, and first acquires vehicle information (step S1). Then, upon determining a vehicle is moving forward and entering an intersection as the above based on the vehicle information, the cameras 10, 20 the front end of the vehicle capture the views Jm and Jn on the left and right sides (step S2). The image acquisition unit 25 acquires the images P captured by the cameras 10, 20 as continuous images P in time series (step S3).

Next, upon determining that the self-vehicle 200 is moving without stopping based on the vehicle information, the image processing unit 210 performs size correction to correct the frame magnification based on shift information and vehicle speed information so that the projection size of a still object (background) in the current image P(t) coincides with that of a still object (background) in the preceding image P(t−1), in order to prevent a change in the size of the still object image in the image P due to the movement of the self-vehicle 200. In addition, it performs lens distortion correction to obtain the image P(t) having no distortion (step S4). Note that this size correction is not performed when the self-vehicle 200 stops.

Next, the first moving region detection unit 30b performs the optical flow processing on the above corrected images P(t), P(t−1), P(t+2), . . . , to detect the regions q(t), q(t+1), q(t+2) occupied by the moving object which has moved in a horizontal direction (a certain direction) in time series in the images P(t), P(t+1), . . . (step S5). Also, the variation calculating unit 220 of the first moving region detection unit 30b obtains a variation in the contour shape of the region q occupied by the moving object, or a variation in the area in the second embodiment (step S6). Further, the first moving region detection unit 30b sets the rectangular image portions Q(t), Q(t+1), Q(t+2) including the region q occupied by the moving object (step S7).

Then, the second moving region detection unit 40 extracts luminance of the image portion Q in the vertical direction (step S8). Further, it correlates horizontal scales and positions of the image portions Q of continuous images P (step S9) to calculate the enlargement rate K of the image portions Q (step S10).

Then, the approaching object determining unit 50b determines, based on the enlargement rate K detected by the second moving region detection unit 40 and the variation calculated by the variation calculating unit 220, whether the object represented by the image portion Q as any one of the other vehicle 300, a pedestrian, a vehicle moving in parallel, and a vehicle moving away.

in this case, the approaching object determining unit 50b determines as a pedestrian including a bicycle the object of the image P determined to be moving by the optical flow when the region q occupied by the object is greater in size than a certain level and the variation in the shape is greater than a certain level, because its shape is not constant (S11->S12->S13).

Meanwhile, it determines the object of a region q whose enlargement rate K is increasing as the other vehicle 300 among the regions q determined to be moving by the optical flow (S11->S12->S14->S15). When the enlargement rate K is maintaining the value, it determines the object of the region q as a vehicle moving in parallel (5S1->S12->S14->S16->S17).

Also, it excludes from the target objects a region q whose enlargement rate K is neither increasing nor maintaining the value among the regions q determined to be moving by the optical flow, determining that the object is a moving-away vehicle and poses no danger to the self-vehicle in the immediate future.

Also in the second embodiment, upon detecting a pedestrian or the other vehicle 300 as in the first embodiment, the operation to attract the attention of passengers of the self-vehicle such as a driver is executed using, e.g., a camera monitor system. In this case, it is preferable to provide different displays for an approaching vehicle and a pedestrian.

Moreover, when the self-vehicle 200 is moving backward, the camera 240 at the rear of the vehicle captures the view behind the self-vehicle 200, and the processing as above is executed. With an approaching object found, the operation to attract the attention of passengers is executed in the same manner as above. For example, a vehicle parked in a parking lot by head-in rather than back-in needs to be gotten out of the parking lot backward, which is difficult for a driver to visually check the area behind the vehicle. However, since the approaching object detection system incorporating the camera fixed to the rear of the vehicle can surely detect an object approaching the vehicle when moving backward, whereas a passenger cannot visually check it easily. Therefore, it can support safe driving of the vehicle.

(Effects Of Embodiment)

Hereinafter, the effects of the approaching object detection system 100*b* in the second embodiment of the present invention are recited.

First, according to the approaching object detection system 100*b* in the second embodiment, the following effects a), b), c), d) are obtainable as in the first embodiment.

a) The first moving region detection unit 30*b* extracts a moving object from two continuous images P, P in time series by the optical flow processing in which only the velocity vectors in a substantially horizontal direction are detected. Thus, compared with detection of the velocity vectors in all directions, it is possible to decrease the computation load and accurately detect (extract) an object moving in a substantially horizontal direction in a short period of time.

b) Whether a moving object in the image P is approaching or not can be determined by the enlargement rate K of the moving object between the continuous images P in time series based on the dynamic programming by the second moving region detection unit 40. Such dynamic programming based processing by the second moving region detection unit 40 requires a light computation load, which makes it possible to accurately detect an approaching object in a short period of time.

c) For determining the enlargement rate K as described in the item b), the second moving region detection unit 40 is configured to obtain the distribution (profile) of the signal values of the image portions Q, Q in the vertical direction; and correlates the distribution of the signal values of the image portion Q(t) in the preceding image P(t) in time series with the distribution of the signal values of the image portion Q(t+1) in the subsequent image P(t+1) in time series using these signal values, to obtain the enlargement rate K. Thereby, a moving object can be easily determined to be actually approaching or not based on the enlargement rate K.

d) Based on the above-mentioned items a) b), it is made possible to reduce the computation load by limiting the direction of an optical flow in the continuous images P in time series to a substantially horizontal direction and reduce failure in detecting an moving object having a less moving amount in a substantially horizontal direction such as an object approaching from the front by the dynamic programming. Thus, an approaching object can be accurately detected with a less computation load.

Furthermore, according to the approaching object detection system 100*b* in the second embodiment, the following effects e) to f) specific to the second embodiment are achieved.

e) For detecting an approaching object by the first moving region detection unit 30*b*, the enlargement rate of the image P is corrected based on the vehicle speed and the moving direction of the self-vehicle 200 so that the size of a non-moving object (background) does not change, while the self-vehicle 200 is in a non-stop state. This accordingly can prevent an erroneous detection caused by a change in the size of a non-moving object (background) on the image P due to forward and backward movement of the self-vehicle 200. Therefore, it is possible to improve the accuracy of detection of an approaching object with less computation load using the dynamic programming by limiting an optical flow in the certain direction and removing a change in the size of a non-moving object (background) on the image P due to the movement of the self-vehicle 200. Furthermore, since removal of the size change of such a non-moving object is done by changing the enlargement rate of the image P, it is possible to reduce the load of correction processing compared with image processing on a specific image on the image P.

f) The lens distortion in each of the cameras 10, 20, 240 is corrected. Accordingly, this can reduce occurrence of erroneous detection due to the lens distortion which causes a difference in a relation between the distance from the self-vehicle 200 and the size of portions of the image P captured through the lens focal point and the lens periphery.

g) A pedestrian including a bicycle is detected from a variation in the shape (change in the area) of the region q occupied by the moving object obtained by the optical flow, so that it is able to limit the direction of the optical flow to be detected to a certain direction and detect a pedestrian with a high accuracy even with a lower computation load using the dynamic programming. A pedestrian tends to move slowly or move in an uncertain direction. It is difficult to detect a pedestrian from adjacent images P in time series, for example, since in the images an optical flow does not likely appear and the enlargement rate K is low. However, it is possible to distinct a difference between a pedestrian and a vehicle or a non-moving object (background) by identifying a pedestrian based on the variation (accumulated value of area difference) in the shape of a plurality of continuous images P in time series, thereby improving detection accuracy.

Especially, in the second embodiment an approaching object is determined even while the self-vehicle 200 is moving. In a case where an approaching pedestrian is present near the self-vehicle 200, possibility of physical contact with a pedestrian is high compared with the self-vehicle 200 not moving. Accordingly, it is more effective to identify a pedestrian as such an approaching object. Furthermore, it is possible to reduce a computation load for determining a pedestrian by performing the determination only on the region q occupied by the moving object of a size greater than a certain level and excluding a pedestrian far away from the self-vehicle 200 and with a low possibility of physical contact.

h) The variation in the shape of the region q occupied by the moving object is determined based on a value obtained by accumulating a difference in the area of the regions q between the continuous images P for a predetermined time. Thus, the area based processing makes the comparison simple, thereby making it possible to simplify the computation. Further, using the accumulated area difference for the determination enables detection of a pedestrian with a high accuracy even though a pedestrian is difficult to be identified in the adjacent images P by the optical flow and the dynamic programming.

Although the embodiments of the present invention have been described above in detail with reference to the drawings, specific configurations are not limited to such embodiments. It should be appreciated that design variations may be made in the embodiments without departing from the scope of the present invention and embodied in the present invention.

For example, the cameras 10, 20, 240 are fixed at the front and the rear of the self-vehicle 200 in the second embodiment. However, position of a camera is not limited to these in the present invention. The camera in the approaching object detection system according to the present invention can be fixed at any part of a vehicle, for example, at a lateral side of the vehicle. Also, a camera is not limited to one fixed to a vehicle as in the first and second embodiments but may be attached to a building or the like instead.

Further, the second embodiment has described an example where the sizes of the images of non-moving objects (background) in the images P are corrected to coincide with each other when the self-vehicle 200 is moving. However, it is necessary to make the sizes of images completely the same as long as the correction is performed to reduce a change in the sizes of the images due to the self-vehicle 200, which can still reduce an erroneous detection compared with no correction Furthermore, the second embodiment has described a correction of the image processing unit 210 when a vehicle moves that the sizes of still objects are corrected to coincide with each other in the continuous images in time series according to the frontward/backward moving amount of the vehicle. In addition, the following correction can be added. That is, when an image portion on the image P moves horizontally due to rotation of the vehicle, the image processing unit can be configured to correct the center of the image P to move in the horizontal direction (x-axis direction) according to the steering angle and the vehicle speed so that the image of a non-moving object stays in the same position on the image P.

CROSS REFERENCE TO RELATED APPLICATIONS

This application claims priority based on Japanese Patent Application No. 2008-296030 filed Nov. 19, 2008 and No. 2009-255666 filed Nov. 9, 2009 in Japan Patent Office, the disclosure of which is hereby incorporated herein by reference in its entirety.

The invention claimed is:

1. An approaching object detection system comprising:
   a camera which is mounted on a vehicle to capture an image in the vicinity of the vehicle;
   a processor configured to:
   perform, on a plurality of continuous images captured in time series by the camera, optical flow processing in which a velocity vector in a certain direction in the images in time series is detected, so that image portions of the images including an object moving in the certain direction is identified;
   obtain a range of variation in luminance values of pixels of the identified image portions in a direction different from the certain direction and correlate the distributions of the continuous images in time series with each other to compute an enlargement rate of size of the image portions; and
   determine, by calculating the enlargement rate as the reciprocal of tan(theta) where theta is based on the image portions of consecutive input images, that the object corresponding to the image portions is approaching the camera, when the enlargement rate is increasing.

2. An approaching object detection system according to claim 1, wherein the (theta) is an angle between a hypotenuse and a base of a right triangle in which edges of image portions Q(t+1), Q(t+2) in the direction different from the certain direction configure two sides of the triangle to define the right angle and Q(t+2) is the base.

3. The approaching object detection system according to claim 1, wherein:
   the certain direction is a direction within a predetermined range including a horizontal direction; and
   the direction different from the certain direction is a vertical direction.

4. The approaching object detection system according to claim 1, wherein the processor is further configured to exclude at least one of a sky region and a ground region from the image captured by the camera before extracting the image portion by the optical flow processing.

5. The approaching object detection system according to claim 1, wherein the processor is further configured to:
   acquire vehicle information on a traveling condition of the vehicle including a vehicle speed; and
   correct, when the vehicle information indicates a movement of the vehicle, a size of the image in the continuous images in time series in such a direction as to reduce a change in size of an image according to the movement of the vehicle.

6. The approaching object detection system according to claim 5, wherein
   the processor is further configured to change an enlargement rate of the image in the size correction according to a vehicle moving distance in the continuous images in time series.

7. The approaching object detection system according to claim 1,
   wherein the processor is further configured to:
   obtain a variation in shape of a region occupied by the object moving in the certain direction between continuous images in time series; and
   determine the object as a pedestrian when the variation in shape of the region is greater than a preset value.

8. The approaching object detection system according to claim 7, wherein the processor is further configured to obtain a difference in area of regions occupied by a moving object which has moved in the certain direction in the continuous images in time series and set a value resulting from accumulation of the differences over the continuous images in time series as the valuation.

* * * * *